US008350722B2

(12) United States Patent
Tewari et al.

(10) Patent No.: US 8,350,722 B2
(45) Date of Patent: Jan. 8, 2013

(54) IDENTIFICATION, ASSESSMENT AND RESPONSE TO ENVIRONMENTAL CONDITIONS WHILE IN AN AUTOMOBILE

(75) Inventors: Asim Tewari, Bangalore (IN); Anil K. Sachdev, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 557 days.

(21) Appl. No.: 12/576,440

(22) Filed: Oct. 9, 2009

(65) Prior Publication Data
US 2011/0084824 A1   Apr. 14, 2011

(51) Int. Cl.
*G08G 1/09* (2006.01)
(52) U.S. Cl. ......................................... 340/905; 701/439
(58) Field of Classification Search .................. 340/540, 340/426.19, 432, 944, 995.19, 995.24, 905, 340/901; 342/357.22; 701/408, 410–412, 701/414–416, 418, 419, 431, 435, 438, 439
See application file for complete search history.

(56) References Cited

U.S. PATENT DOCUMENTS

| 2004/0039517 A1* | 2/2004 | Biesinger et al. ............. 340/907 |
| 2008/0033644 A1* | 2/2008 | Bannon ......................... 701/210 |
| 2010/0207787 A1* | 8/2010 | Catten et al. .................. 340/905 |

* cited by examiner

*Primary Examiner* — Thomas Mullen
(74) *Attorney, Agent, or Firm* — Reising Ethington P.C.

(57) ABSTRACT

A method is disclosed for estimating the exposure of vehicle occupants to environmental conditions capable of inducing a least discomfort. The occupants are alerted to their proximity to a zone where environmentally-challenging conditions exist and, in a first embodiment, the details of the environmental condition and the estimated duration of any exposure is communicated to the occupants; in a second embodiment a suggested course of action by which the occupants may mitigate the effect of the environmental occurrence is communicated; and in a third embodiment the proposed course of action is automatically executed subject to override by the occupants.

13 Claims, 1 Drawing Sheet

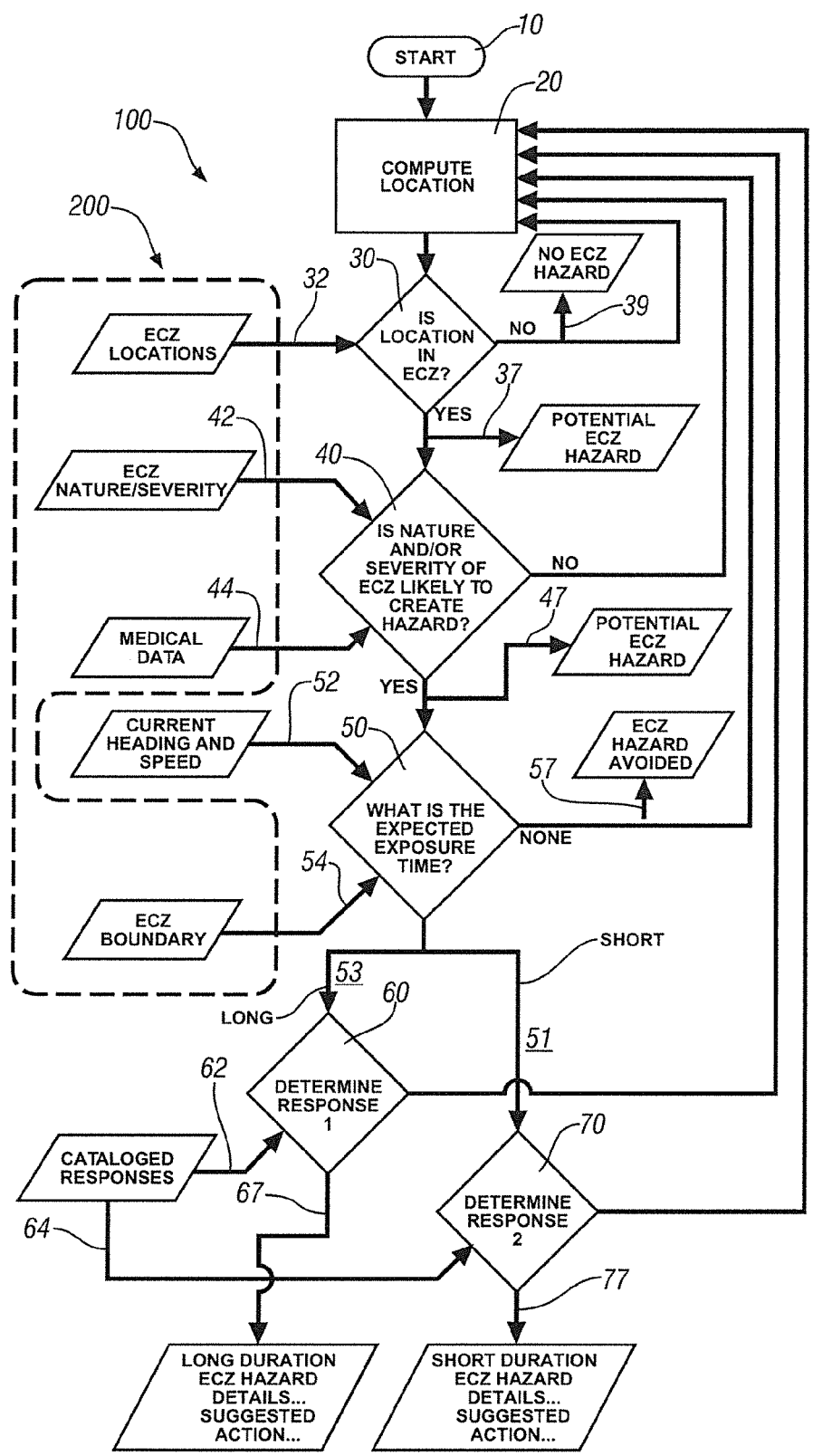

IDENTIFICATION, ASSESSMENT AND RESPONSE TO ENVIRONMENTAL CONDITIONS WHILE IN AN AUTOMOBILE

TECHNICAL FIELD

This invention relates to methods for identifying environmental conditions which may be encountered by occupants of an automobile; methods for assessing whether the conditions pose a hazard or inconvenience to vehicle occupants; and methods for eliminating or mitigating any such hazard or inconvenience.

BACKGROUND OF THE INVENTION

Motor vehicles in transit will necessarily encounter a variety of environmental conditions which may result in inconvenience or hazard for the occupants of the vehicle. Some of these environmental conditions may be permanent and in a fixed location, for example, a landfill emitting noxious odors, or a continuously-running plant emitting pollutants; some may be transitory and in fixed locations, such as an odor-emitting plant operating during restricted hours, or dust or pollen occasioned by plowing of fields or harvesting of crops; and some may be transitory and occur in varying locations such as vehicle emissions associated with traffic jams.

Many of these conditions and others such as:
high levels of dust or other building material debris around construction sites;
natural climatic situations like sand storms, acid rain, hail storm, volcanic dust, etc.;
odors etc. near swamps;
high noise, for example in blast areas;
insect swarms for example, mosquitoes, bees, grasshoppers, fish flies etc.

may be either inconvenient for the occupants of the automobile or may in combination with medical conditions such as asthma, emphysema or insect bite allergies pose hazards for vehicle occupants.

Thus it is desirable to identify and preferably anticipate such conditions; assess what, if any, level of concern they raise; and take appropriate remedial action. One remedial action, suitable for situations where a vehicle has already entered an environmentally-challenging zone could include adjustments to on-vehicle settings to modify the internal vehicle environment. For example, closing windows, setting the air conditioner to re-circulate internal air rather than drawing in external air etc. Another remedial action, one which is most effective when knowledge of environmentally-challenging zones is available prior to the vehicle's entering the zone, would include changes to the vehicle route, preferably under minimal trip time penalty.

One approach to identifying such zones could involve equipping a vehicle with sensors capable of detecting at least a sub-set of these environmentally-challenging conditions and sufficient computing 'intelligence' to interpret the sensor signals. The computing device would respond appropriately to any threat or perceived threat, either by alerting vehicle occupants or by making automatic adjustments to vehicle controls. However, consideration of the listing of conditions above indicates that such an approach would mandate a very large number of sensors, significant computing power and sophisticated algorithms capable of synthesizing simultaneous inputs from multiple sensors. The problem becomes at least more cumbersome and probably more complex if any level of redundancy is desired and if multiple chemical sensors are selected to enable response-specificity to particular chemical species.

Further in-vehicle sensors can provide no data capable of anticipating environmentally-challenging conditions. Sensors will respond only to conditions which are already present and thus a sensor-based approach will abbreviate the range of allowable responses. For example, selection of an alternate route to avoid a particular condition is made much more difficult and correspondingly less flexible if the selection is only made when a sensor has detected that a vehicle has already entered an environmentally-challenging area.

Thus there is a need for a means of identifying the nature and location of environmentally-challenging zones with sufficient anticipation to afford maximum flexibility in response.

SUMMARY OF THE INVENTION

GPS units currently can provide information to a vehicle operator on current position, points of interest, directions to a destination and real time or near real time traffic hazards on the planned route.

In a first embodiment this invention seeks to expand on this capability by alerting vehicle occupants to exposure to environmental conditions which may cause discomfort or hazard to vehicle occupants. Regions where environmental effects may induce discomfort or hazard will be designated as environmentally-challenging zones, hereafter abbreviated as ECZ and as will be described in greater detail later, the GPS-based system will be resourced with comprehensive knowledge of the nature, bounds and severity of ECZs. Thus the current position of the vehicle as determined by the GPS-based system may be compared to the bounds of the ECZ. If the vehicle's location lies outside the bounds of the ECZ by some pre-determined distance, no action is taken. If the vehicle is located within the bounds of the ECZ, the duration of the exposure will be calculated based on knowledge of the bounds of the ECZ, the vehicle's route and the vehicle's speed. The vehicle occupants will then be alerted to the environmental condition aurally and/or visually. The alert may be non-specific, for example a repeated tone or a flashing light, but, more preferred is that the information on nature, severity and duration of exposure to the environmentally-challenging condition be communicated to the vehicle occupants using known display or voice technology.

In a second embodiment, the GPS-systems-derived knowledge of the nature, severity and duration of exposure to the environmental conditions as determined in the first embodiment may be used to prompt an automatic response. For example, each combination of environmental condition, duration and severity would be compared to a pre-determined listing of conditions and responses which may be stored, for example in a look-up table in a computer. The response strategies could be pre-set or customized by vehicle operators or passengers to reflect their sensitivity to specific environmental conditions. Some non-limiting example responses might be; to close the windows and re-circulate the air in the vehicle; or to re-route the vehicle. These automated responses could also be over-ridden by an operator if desired.

In a third embodiment, since many users of GPS-based systems will use the system to plan a route, the route may be compared with the listing of ECZs. If no ECZ's will be traversed by a vehicle following the pre-set route no action will be taken. If the route will traverse one or more ECZs then the expected duration of exposure may be calculated based on average vehicle speeds on that specific part of the route, and the nature, duration and severity of the exposure determined.

These data, as in the second embodiment, would be compared to a pre-existing listing of conditions and responses which could be pre-set or customized by vehicle operators or passengers to reflect their sensitivity to specific environmental conditions. Based on this comparison and response listing, an appropriate response, which might be over-ridden by a vehicle operator, would be selected.

This invention requires the storage of information on ECZs into a GPS-based device unit. For fixed ECZs, which are active continuously, an approach analogous to that currently used to store information on points of interest or POIs could be used. Examples could be a malodorous landfill or swamp. Since GPS-based devices 'know' the current time, a similar approach may be followed for fixed ECZs which are active on a known schedule, for example an odor- or pollution-emitting plant working one or two shifts per day, or a quarry where blasting occurs only on working days. Information on these ECZs such as their nature, bounds and severity would be communicated to the driver based either on current position or on the basis of a planned destination and route developed by the GPS unit. Vehicle operators would have an option to suppress notification and enable automated responses only if desired. Alternatively subscribers to companies offering on-request routing services, such as, for example OnStar™ may elect to have a live conversation with a service representative in a call center.

The GPS-based systems knowledge of the location of transitory or mobile ECZs would be based on broadcasts from a communication center in a manner analogous to the real-time or near real-time traffic information broadcasts currently used to alert vehicle operators to traffic delays. Notification of an ECZ due to higher than average concentrations of exhaust fumes resulting from traffic concentrations occasioned by traffic delays is clearly feasible. However this data may, in the context of this invention, be further enhanced by incorporating weather data to further refine the environmental assessment. For example the severity rating for a traffic backup on a still day could be different from the severity rating of the same backup on a windy day more suited to dispersal of exhaust gases.

Extension of this invention to address transient or variable location ECZs requires only that the information be made available to the source of the near real-time data. The best and most current source of such data is clearly other vehicle operators who on encountering such a situation would communicate, using appropriate voice or data transmission technology, the information to a data center for collection, analysis and broadcast.

The elements of the invention are thus: the use of GPS to inform vehicle operators and passengers of environmentally-challenging zones either proximate to their current location or on their intended route; a means of selecting a preferred and customizable response to an environmentally-challenging situation; a means of automating the response; and a means of manually over-riding the response if desired.

BRIEF DESCRIPTION OF THE DRAWINGS

FIG. 1 is a flow diagram indicating the decision steps and required inputs and outputs in practice of this invention.

DESCRIPTION OF PREFERRED EMBODIMENTS

Vehicles in use encounter other than ideal environments on a regular basis. Many of these environmental conditions are transitory and pose no more than a minor inconvenience for the vehicle occupants. However there are conditions which may persist for a considerable time and which may pose a greater inconvenience, hazard or threat to the vehicle occupants, particularly occupants with specific medical conditions and allergies. Clearly it would be beneficial to integrate knowledge of such environmentally-challenging zones with knowledge of a vehicle's current and projected location to enable some timely remedial action to mitigate any potential ill-effects of exposure to such environment.

Practice of the invention requires near-continuous real-time knowledge of vehicle position. This may be obtained with a stand-alone GPS unit; a GPS unit integrated with another electronic device such as a cell-phone or other mobile communication system or Personal Digital Assistant and capable of receiving or providing information during vehicle operation; or a GPS capability integrated with a full-featured communication system such as OnStar™.

In keeping with the range of capabilities of these technologies, suggested remedial responses may be communicated to vehicle occupants providing opportunity for occupants to implement or ignore the suggested actions. For systems which have access to a vehicle databus, such as OnStar™ the actions may be undertaken automatically, or undertaken automatically only after providing opportunity for manual override. This listing is illustrative only and is not intended to limit, exclude or constrain any responses or combination of responses not described.

Practice of the invention further requires some limited computing capability. This may be intrinsic to or linked to the vehicle position sensing device or it may be a stand-alone computer. It may also be a general-purpose or low usage on-vehicle computer capable of task sharing so that it may support the practice of the current invention in substantially real time without compromising its other function(s).

Practice of this invention still further requires the availability of data storage readable by the computing device. This capability may be intrinsic to or linked to the vehicle position sensing device or may be a stand-alone storage device. The storage capability may be suitable for batch data update such as a removable flash memory card which may be updated by attachment to a computer or may be integrated with the computing device and capable of receiving and integrating wireless updates on a continuing basis. The stored data will generally comprise the location and extent of known ECZs. However for complete assessment of any hazard posed by an ECZ the nature of the ECZ, for example odor, noise, pollutants should also be included as should some indication of its severity.

The practice of the invention may occur in real time during a trip or may occur virtually during trip planning. As will become evident, the range of options available will be truncated when the invention is practiced in real time but the basic practice of the invention is unaffected by whether the invention is practiced in the course of a real or virtual trip.

While the detailed capabilities which may be accessible with each category of position location systems will vary, the major features of the invention may be practiced with any of the capabilities listed. However it will be appreciated that the utility of the invention will be greatest when knowledge of ECZs is most extensive. Thus position-sensing systems with a coupled communication capability to receive timely information on transitory events, for example traffic jams, fires or insect swarms, to enable accurate current ECZ information will be most useful in practice of this invention during a trip. However, in trip planning, which may be done long before the trip is undertaken, only stable ECZs will be considered and the availability or lack of availability of current rather than historical ECZ data will be immaterial.

The invention and its capabilities may best be understood by reference to FIG. 1, a flow diagram showing the sequence of steps followed in practice of the invention.

The overall process is indicated as 100. At the outset of a trip, real or virtual, the GPS would 'Start' 10 and immediately compute the vehicle location ('Compute Location') at 20. Stored information on the locations and extents, nature and severity of known environmentally-challenging zones (ECZs) will be readily accessible to at least the GPS unit. This information will be stored at 200 preferably as a structured, well-cataloged look-up table in an electronic storage device enabling searches to be conducted on only that portion of the database corresponding to locations in the immediate vicinity of the vehicle to minimize search time.

At step 30, "Is Location in ECZ?", the vehicle location information is transferred to the computing device and compared to the stored ECZ information, specifically the ECZ locations, input 32, which has also been transferred to the computing device. This enables a determination of whether the vehicle is located within an ECZ. Alternatively and preferably a determination is made of whether the vehicle is located within some user-selectable distance of an ECZ. A yet further refinement is to assess whether the vehicle's path will cause it to traverse an ECZ based on a preplanned route or restricted route choices, for example a restricted access highway. These anticipatory strategies enable consideration of a wider range of options and afford a longer response time for implementation of these options.

If the vehicle position is not located in an ECZ or within the pre-determined user-selectable distance of the ECZ, ("No" response) the process loops back to step 20. The vehicle location is again computed and again transferred to the computing device; the stored ECZ information accessible to the computing device is updated if necessary and the updated vehicle location is again compared to the stored data on locations of known ECZs.

This process continues until the comparison of real-time GPS data and stored ECZ location data indicates that the vehicle is in or proximate to an ECZ. Following the "Yes" response at step 30, the process advances to step 40 ("Is the nature and/or severity of ECZ likely to create hazard?") and the computing device further interrogates database 200 to extract information on the nature and severity of the ECZ, input 42. At step 40, the likelihood of the nature and severity of the ECZ to create hazard to the occupants is reviewed based on suitable algorithms capable of relating the nature of and severity of the ECZ to physiological well-being. This may be done on the basis of generic information on the influence of the ECZ nature and severity on an average individual or it may be informed by specific medical attributes of the vehicle occupants, provided to the computing device as input 44. If it is assessed that no hazard will result from exposure to the ECZ, "No" response, the process loops back to step 20 to re-determine the vehicle location and continue processing.

If it is assessed that a hazard will result, "Yes" response, the process advances to step 50 ("What is the expected exposure time?"). At step 50 the computing device then computes an expected exposure time or time to traverse the ECZ, making use of computed values of current heading and speed, input 52, coupled with knowledge of the boundaries of the ECZ, input 54, extracted from database 200. It will be appreciated that when this determination is triggered under the anticipatory option of step 30 when the vehicle is located at some preset distance from an ECZ, there will be some vehicle paths which will cause the vehicle to avoid the ECZ.

If the exposure time is "None", no further action is required and the process will loop back to step 20, "Compute location". If the exposure time is "Long", 53, one series of responses will be determined ("Determine Response 1", 60). If the exposure time is "Short" 51, a second series of responses will be determined ("Determine response 2", 70). After either response is determined the process loops back to step 20 and again computes vehicle location. It is preferred that a range of potential responses be cataloged and stored for communication to the computing device as input 64 or 62 depending on whether a "Long" or "Short" duration condition exists.

Following this approach, combinations of specific conditions, severities and durations of exposure may be associated with specific responses and identified by a simple computing strategy such as table look-up to facilitate rapid determination of a response. In addition to speed, such an approach, which implies that the responses were developed and evaluated beforehand, has the further advantage that responses can be tested and their efficacy evaluated prior to use. Such an approach has the further advantage that by limiting the number of responses to a finite set, vehicles with the capability to access the vehicle databus may, if desired, be pre-programmed to promptly and automatically execute any desired response.

A wide range of responses may be proposed but they will have one feature in common: a means of minimizing exposure of the vehicle occupants to the environmental condition.

Some responses may be implemented by modifications to a vehicle's ventilation settings and could include: closing windows and sunroofs; shutting off the ventilation fan to reduce the flow of outside air through the HVAC unit; raising the speed of the HVAC fan to increase the pressure inside the vehicle provided HVAC-sourced air is reliably filtered and/or conditioned, for example by passage through an activated charcoal filter; or even supplying additional oxygen to the passenger compartment by use of a portable oxygen concentrator, again coupled with excellent filtering and conditioning.

Other responses may be predicated on changes in vehicle operation. The most obvious is to use the capabilities of the GPS unit to determine an alternate route subject to appropriate constraints which would typically be minimizing loss of time.

Clearly, the effectiveness of these responses will vary depending on circumstances. Changes in route with minimal loss of time would be expected to be most effective in trip planning when the choice of alternate routes is greatest. Changing vehicle ventilation is clearly the best strategy when an ECZ is actually entered.

Responses may be implemented either by the operator or automatically. Automatic implementation may be enabled only by those position-locating devices which both have capability to and are permitted to access the vehicle databus. However even when automatic implementation is feasible many operators will prefer to retain the choice of accepting or rejecting the automatic response. Thus the invention will include means of alerting vehicle occupants, particularly the driver, of an imminent or on-going environmentally-challenging event.

Alerts may be audible or, with appropriate display devices, visual or a combination of both. Audible alerts are preferred to gain the vehicle occupant's attention but a visual display is more effective in conveying detailed information on the actions to be taken.

None of the remedial actions suggested can take effect immediately. Thus alerts should be issued as soon as possible, that is at step 30 even though the nature, severity and extent of the environmental issue are unknown at this step in the process. Thus it is preferred that the system trigger an alarm to alert the driver and occupants as soon as the vehicle's proximity to an ECZ reaches a pre-selected value. This could be selected as a distance, for example 1 mile. However it is preferred that the proximity be based on expected travel time to enter the ECZ based on current vehicle speed and heading, for example 1 minute. This would afford a constant period for action irrespective of vehicle speed or heading.

Thus at step 30, a visual notification of "No ECZ Hazard" might be displayed at 39 whenever the vehicle was suitably distant from an ECZ. Alternatively a symbol may be used, for example a green dot. Similarly notification 37, "Potential ECZ Hazard" could also be displayed or visually conveyed symbolically, for example by means of a red dot or flashing red dot or any other representation as is obvious to those skilled in the art. Preferably however such a visual display will be supplemented by an audible alarm to better attract the occupant's attention. It will be appreciated that any audible alarm should be operated under software control so that it may be conveniently terminated and reset before becoming irritating to the occupants. For example the audible alarm could be activated for only a period corresponding to some preset number of executions of step 50 and reset by passage of a preset period of time during which operation 60 is not performed.

As further information becomes available at steps 40, 50 and 60 it can be routed to a display and convey to the occupants the details of the environmental challenge and the recommended pre-determined action to take. For example communication 47 should continue to display, explicitly or symbolically the message of communication 37 since little additional useful information can be conveyed to the occupants at this stage. At communication 57 when it is estimated that the ECZ will not be encountered, an explicit message to that effect should be displayed, "ECZ Hazard Avoided".

When an ECZ will be encountered, the occupants should be made aware of all relevant information. Thus at communication 77, "Short Duration ECZ Hazard. Details . . . Suggested Action . . . ", the information provided should include the nature of the hazard, the expected duration of exposure and the actions which the occupants should exercise to mitigate its influence. Similar considerations hold for communication 67, "Long Duration ECZ Hazard. Details . . . Suggested Action . . . ".

It will be appreciated that simply updating the display in concert with updating of the position information, typically at a rate of 1 Hz although up to 20 Hz may be achieved on specialized instrumentation, will yield a flickering display. Thus appropriate circuitry to enforce on-going display of information which does not require updating while updating only time-varying information will be required. For example, in communication 77, the nature of the hazard and the suggested remedial actions should be displayed continually as long as the vehicle is located within the ECZ but the exposure duration might be continually updated. These and other considerations are well known to those skilled in the art.

Thus the occupants would progressively be made aware of the nature and severity of the hazard at output. The occupants would then be responsible for executing the response. Since operation 20, "Compute Location", is performed continually, the absence of any visual display except communication 39 may be used to indicate that the ECZ has been exited and that no environmentally-challenging situation now exists or a separate communication such as "ECZ Exited" (not shown) might be employed.

Finally for those systems so capable the "Suggested Actions" could be displayed for a pre-selected time period and a response solicited from the occupants on whether or not to implement the "Suggested Actions". Normally the default for lack of timely response would be to implement the "Suggested Actions". Thus the occupants would be required to respond only if the "Suggested Action" should not be implemented.

Communication has been described in terms of visual display. However, text to speech technology is well known and the communication may be conveyed audibly. Most units having GPS capability have both visible and audible communication as well as text to speech capability and thus audible communication may also be employed without loss of generality.

Thus, it is seen that the objects of the present invention may be efficiently obtained, although modifications and changes to the invention should be readily apparent to those having ordinary skill in the art, and these modifications are intended to be within the spirit and scope of the invention as claimed.

The invention claimed is:

1. A computer-based method of alerting occupants of a motor vehicle at a current location of their proximity to a region, the region having a known location and an extent, and being characterized by a known environmental condition whose nature and severity are known, the environmental condition being capable of inducing at least discomfort in an occupant of the vehicle, the method comprising:

identifying the current location of the vehicle;

comparing the current vehicle location with the known location and extent of the region with the known environmental condition;

determining whether the current location of the vehicle lies within a pre-selected distance of the region with the known environmental condition;

predicting, based on knowledge of current vehicle speed and route, and knowledge of the location and extent of the region, any potential for exposure of the vehicle occupants to the environmental condition; and, if such potential exposure is predicted, alerting the vehicle occupants of their proximity to the environmental condition and of their predicted potential exposure to the known environmental condition; then, estimating an expected duration of any potential exposure of the vehicle occupants to the known environmental condition; and providing a visual display to the occupants of the vehicle of the nature and severity of the environmental condition and the estimate of the potential exposure duration.

2. The method of claim 1 in which the alert is an audible alert.

3. The method of claim 1, further comprising receiving broadcast information regarding the extent and environmental condition of a region upon request of a vehicle occupant.

4. A computer-based method of communicating predetermined remedial actions to the occupants of a motor vehicle at a current location when the vehicle is determined to be within a preselected distance of a region; the region having a known extent and location, and being characterized by an environmental condition whose nature and severity are known; the environmental condition being capable of inducing at least discomfort in an occupant of the vehicle, the method comprising:

identifying the current location of the vehicle;

comparing the current vehicle location with the known location of the region with the known environmental condition;

determining whether the current location of the vehicle lies within the pre-selected distance of the region;

predicting, based on knowledge of current vehicle speed and route and knowledge of the extent and location of the region, the duration of any potential exposure to the known environmental condition characteristic of the region; and, if such potential exposure is predicted, comparing the nature, potential exposure duration and severity of the known environmental condition characterizing the region to which the occupants are potentially exposed to a stored listing of environmental conditions, the listing comprising a plurality of entries, each entry having associated data comprising an environmental condition and its severity, an exposure duration and at least one remedial action; and when a listed environmental condition entry substantially corresponding to the predicted potential environmental condition exposure, exposure duration and severity is found, communicating the associated remedial action for that entry to the vehicle occupants.

5. The method of claim 4 further comprising automatically executing the associated remedial action.

6. The method of claim 4 comprising requesting authorization from the occupants prior to automatically executing the associated remedial action.

7. The method of claim 4 in which the associated remedial action is one or more of: determining an alternate route; closing windows and sunroofs; shutting off a passenger compartment ventilation fan; raising the operating speed of a passenger compartment ventilation fan; and supplying additional oxygen to a passenger compartment.

8. The method of claim 4, further comprising receiving broadcast information regarding the extent and environmental condition of a region upon request of a vehicle occupant.

9. A computer-based method of communicating predetermined remedial actions to the occupants of a motor vehicle at a current location when the vehicle is determined to be within a preselected distance of a region; the region having a known extent and location and being characterized by an environmental condition whose nature and severity are known; the environmental condition being capable of inducing at least discomfort in an occupant of the vehicle, the method comprising:

receiving data on a region characterized by an environmental condition;

identifying the current location of the vehicle;

comparing the current vehicle location with the known location of the region with the known environmental condition;

determining whether the current location of the vehicle lies within the pre-selected distance of the region;

predicting, based on knowledge of current vehicle speed and route, and knowledge of the extent of the region, the duration of any potential exposure to the environmental condition characteristic of the region; and, if such potential exposure is predicted, comparing the nature, potential exposure duration and severity of the known environmental condition characterizing the region to which the occupants are potentially exposed to a stored listing of environmental conditions, the listing comprising a plurality of entries, each entry having associated data comprising an environmental condition and its severity, an exposure duration and at least one remedial action; and when a listed environmental condition entry substantially corresponding to the predicted potential environmental condition exposure, exposure duration and severity is found, communicating the associated remedial action for that entry to the vehicle occupants.

10. The method of claim 9, the method further comprising requesting data on at least a region characterized by an environmental condition.

11. The method of claim 9 further comprising automatically executing the associated remedial action.

12. The method of claim 11 in which the associated remedial action is one or more of: determining an alternate route; closing windows and sunroofs; shutting off a passenger compartment ventilation fan; raising the operating speed of a passenger compartment ventilation fan; and supplying additional oxygen to a passenger compartment.

13. The method of claim 9 comprising requesting authorization from the occupants prior to automatically executing the associated remedial action.

* * * * *